United States Patent [19]

Burns

[11] Patent Number: 4,835,238

[45] Date of Patent: May 30, 1989

[54] POLYSILACYCLOBUTASILAZANES

[75] Inventor: Gary T. Burns, Midland, Mich.

[73] Assignee: Dow Corning Corporation, Midland, Mich.

[21] Appl. No.: 59,718

[22] Filed: Jun. 8, 1987

[51] Int. Cl.[4] .............................................. C08G 77/62
[52] U.S. Cl. ........................................ 528/28; 528/10; 528/32; 528/38; 528/40; 556/410; 556/412; 501/88; 501/97; 501/154
[58] Field of Search ....................... 556/410, 412, 409; 501/97, 88, 154; 528/28, 10, 32, 40, 38

[56] References Cited

U.S. PATENT DOCUMENTS

| | | | |
|---|---|---|---|
| 2,564,674 | 8/1947 | Cheronis | 260/448.2 |
| 2,607,791 | 3/1949 | Goodwin | 260/448.2 |
| 3,046,291 | 7/1962 | Sommer | 260/448.2 |
| 3,398,178 | 8/1968 | Nelson | 260/448.2 |
| 3,445,495 | 5/1969 | Nelson | 260/448.2 |
| 3,687,995 | 8/1972 | Jones et al. | 260/448.8 |
| 3,719,696 | 3/1973 | Jonas et al. | 260/448.2 |
| 3,809,713 | 5/1974 | Boersma et al. | 260/448.2 |
| 3,853,567 | 12/1974 | Verbeek | 106/44 |
| 3,892,583 | 7/1975 | Winter et al. | 106/55 |
| 4,159,259 | 6/1979 | Yajima et al. | 528/14 |
| 4,312,970 | 1/1982 | Gaul | 526/279 |
| 4,340,619 | 7/1982 | Gaul | 427/228 |
| 4,395,460 | 7/1983 | Gaul | 428/408 |
| 4,397,828 | 8/1983 | Seyferth et al. | 423/344 |
| 4,404,153 | 9/1983 | Gaul | 264/29.2 |
| 4,482,669 | 11/1984 | Seyferth et al. | 524/442 |
| 4,482,689 | 11/1984 | Haluska | 528/25 |
| 4,535,007 | 8/1985 | Cannady | 427/226 |
| 4,540,803 | 9/1985 | Cannady | 556/412 |
| 4,543,344 | 9/1985 | Cannady | 501/92 |

*Primary Examiner*—John C. Bleutge
*Assistant Examiner*—Ralph H. Dean, Jr.
*Attorney, Agent, or Firm*—James E. Bittell

[57] ABSTRACT

The reaction of 1,1-dichlorosilacyclobutanes with nitrogen-containing difunctional nucleophiles gives polysilacyclobutasilazanes which can be crosslinked and also converted to ceramic materials.

21 Claims, No Drawings

POLYSILACYCLOBUTASILAZANES

BACKGROUND OF THE INVENTION

This invention relates to the preparation of polysilacyclosilazanes from 1,1-dichloro-1-silacyclobutane. These materials are useful as intermediates to form crosslinkable preceramic polymers which are useful to form ceramic materials upon pyrolysis.

What is disclosed herein is a novel process to obtain new and novel polymers which contain a strained ring silacycle in the polymer structure.

The process consists of forming polysilacyclobutasilazanes from dichloro substituted silacyclobutane and difunctional nucleophiles containing nitrogen atoms having at least one active proton on each nitrogen atom, in an inert, essentially anhydrous atmosphere at temperatures below room temperature. The intensive study of the chemistry of organosilicon heterocycles was precipitated in the late 1950's and increased substantially in the early 1960's. Many papers have been written on the formation of the organosilicon heterocycles and their ring opening capabilities. For example, Goodwin, in U.S. Pat. No. 2,607,791 issued on Aug. 19, 1952, describes the preparation of "cyclic silahydrocarbons" by reacting alkali metal with a mixture of $R_2XSiCH_2SiXR_2$ and $(XCH_2)_2SiR_2$, in the liquid phase wherein R is an alkyl group and X represents a halogen atom, to give fluid cyclic compounds of the type $(CH_2SiR_2)_n$ wherein in this example, n=3. Goodwin alludes to the existence of the possibility of preparing cyclics wherein n is equal to 3 to 50. J. Laave, in an article entitled, "Synthesis of Silacyclobutane and Some Related Compounds", JACS, 89:5, Mar. 1, 1967, pp. 1144–1147, shows the preparation of 1,1-dichloro-1-silacyclobutane by contacting magnesium powder in ethyl ether with 3-chloropropyltrichlorosilane. The polymerization of these heterocyclic silicon compounds was also studied extensively during the same time frame. Sommer, In U.S. Pat. No. 3,046,291, issued July. 24, 1962, discloses, for example, the process of preparing essentially linear carbon silicon polymers of the type $(CH_2SiR_2)_n$ wherein at least one R is hydrogen or chlorine, by thermally opening the silacyclobutane ring by heating to temperatures of 50° C. to 200° C. Sommer also notes that different types of polymers can be obtained if the polymerization takes place in the presence of oxygen and/or water, in that, oxygen is introduced randomly into the polymer to form siloxane linkages, resulting in random siloxane, silmethylene copolymers.

Nelson, in U.S. Pat. No. 3,398,178, issued Aug. 20, 1968, discloses the polymerization of silacyclobutanes to provide fluids, gums and elastomers. The polymerization involves a method of polymerizing with a catalytic amount of a compound selected from $R''_mX_nSiH_{4-m-n}$, $AlX_3$ and HX to give a polymer consisting essentially of $(SiR_2CH_2CHR'CH_2)$ units. In the case where $R''_mX_nSiH_{4-m-n}$ is used, chlorosilanes are indicated as being useful. Thus, 1,1-dimethyl-1-silacyclobutane was reacted with $(CH_3)_3SiCl$ to give a polymer having the repeating unit $(Si(CH_3)_2CH_2CH_2CH_2)$. In U.S. Pat. No. 3,445,495, issued May 20, 1969, Nelson shows the polymerization of silacyclobutanes and disilacyclobutanes using a platinum-containing material as the catalyst. The polymers so-produced, contain units of the formula $(SiR_2CH_2CHR'CH_2)$ and/or $(SiR_2CH_2SiR_2CH_2)$. Later, in 1972, in U.S. Pat. No. 3,687,995, issued Aug. 29, 1972, Jonas et al. disclose the formation of novel silacyclobutanes which they alleged were useful as cross-linking agents and intermediates for organosilicon polymers. The novelty of the silacyclobutanes was the presence of functional groups on the silicon atom that were reactive with silanol functional organopolysiloxanes. Such functional groups on silicon were described as alkoxy and amino radicals. Jonas et al. also describes the novel materials as being useful as intermediates in the preparation of organosilicon resins and compounds containing silacyclobutane structures, but Jonas et al. do not describe even in a general sense, which organosilicon resins and compounds are useful, or how one skilled in the art may approach such preparations. However, in 1973, Jonas et al. disclosed organosilicon polymers containing silacyclobutane structures, in U.S. Pat. No. 3,719,696, issued Mar. 6, 1973. Such polymers, containing $CH_2CHRCH_2(R'_m) SiO_{2-m}$ units derived by the hydrolysis or cohydrolysis of silanes of the formula $CH_2CHRCH_2(R'_m)SiY_{2-m}$ lead to polymers containing strained ring silacycles in the organosilicon polymer itself. Both homopolymers and copolymers with $R_nSiO_{4-n}$ or $(SiR''_2CH_2SiR''_2)$ are described, a special point being made by Jonas et al. at column 2 lines 54 et seq., that polymers are formed containing terminal silacyclobutane structures which lead to crosslinkable rubbery products useful in the manufacture of organosilicon based elastomers.

Silazanes in general have been academic curiosities for many years and a variety of such silazanes, including monomers, oligomers, cyclics, low molecular weight and high molecular weight resins and linears have been prepared by a variety of methods.

For example, L. W. Breed et al., in the Journal of Organic Chemistry, 27, 1114 (1962) report the formation of silazanes from the polymerization of sterically hindered silazane oligomers, while in the Journal of Polymer Science, A 245 (1964), cyclic trimer and tetramer silazanes are reported to be thermally cracked, using catalysts to give linear polymers.

In contrast, fluids, rubber polymers and resins prepared from $CH_3SiCl_2(CH_2)_2SiCl_2$ and excess ammonia have been reported by Kruger et al. in the Journal of Polymer Science, A 2 3179 (1964).

The patent literature also contains disclosures of the preparation of silazanes. Cheronis, in U.S. Pat. No. 2,564,674 discloses the preparation of low molecular weight linear silazane polymers by the reaction of halosilanes with excess ammonia in a solvent solution. Bausma, et al., in U.S. Pat. No. 3,809,713 discloses a similar reaction scheme with the added modification of removing the by-produced solid ammonium halide using ethylene diamine.

Verbeek et al, in U.S. Pat. No. 3,853,567 and U.S. Pat. No. 3,892,583 disclose that mixtures of $CH_3SiCl_3$ and $(CH_3)_2SiCl_2$ can be treated with ammonia or organoamines to form materials that can be pyrolyzed to yield $SiC/Si_3N_4$ ceramic materials.

More recently, Gaul in U.S. Pat. No. 4,312,970, issued Jan. 26, 1982, disclosed the preparation of polysilazanes such as $\{(CH_3)_3Si\}_2NH$. In his synthesis, $(CH_3)_3SiCl$ was eliminated as a by-product. These materials can be pyrolyzed at high temperatures to form Si-C-N containing ceramics. In addition, Gaul, in U.S. Pat. No. 4,404,153, issued July 20, 1982, disclosed preceramic polysilazanes which had been prepared by the reaction of chlorine-containing disilanes and disilazanes. Cannady, in U.S. Pat. No. 4,543,344 discloses polymers prepared by reacting HSiCl₃ and disilazanes and later, Cannady, in U.S. Pat. No. 4,540,803, issued Sep. 10, 1985, described a modification to Gaul's earlier process to include the preparation of a polyhydridomethylsilazane polymer from HSiCl₃, and hexamethyldisilazane.

Polymers have been developed and disclosed: by Gaul in U.S. Pat. No. 4,395,460, issued July 26, 1983; U.S. Pat. No. 4,404,153, issued Sept. 13, 1983; Haluska in U.S. Pat. No. 4,482,689, issued Nov. 13, 1984; Seyferth, et al. in U.S. Pat. No. 4,397,828, issued Aug. 9, 1983; and U.S. Pat. No. 4,482,669, issued Nov. 13, 1984; Cannady in U.S. Pat. No. 4,535,007, issued Aug. 13, 1985; Bujalski in United State patent application Ser. No. 653,003, filed Sept. 21, 1984, now abandoned; Baney, et al. in United State patent application Ser. No. 652,938, filed Sept. 21, 1984, now abandoned; and Ser. No. 653,939 filed Sept. 21, 1984, now abandoned Haluska United State patent application Ser. No. 925,145, filed Nov. 3, 1986 and application Ser. No. 926,607, filed Nov. 4, 1986, now U.S Pat. No. 4,742,143

In spite of an intensive search, however, the inventors herein were unable to find any suggestion or teaching in the art regarding the formation of polysilacyclobutasilazanes.

THE INVENTION

This invention relates to a new class of silazane polymers and a process for their preparation.

More specifically, this invention deals with the preparation of polysilacyclobutasilazanes which are prepared from 1,1-dichloro-1-silacyclobutane and certain difunctional nucleophilic reactants.

Thus, this invention relates to a process for preparing polysilacyclobutasilazanes comprising:
(I) contacting and reacting in an inert, essentially anhydrous atmosphere, 1,1-dichloro-1-silacyclobutane having the general formula

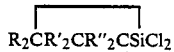

with a difunctional nucleophile selected from the group consisting of
(i) ammonia
(ii) hydrazine and,
(iii) diamines having the general formula HR'''NQNR''''H at a temperature of minus 50° to +25° C. for a time sufficient to form polysilacyclobutasilazane;
(II) recovering the polysilacyclobutasilazane from the reaction mass in (I) wherein each R, R', R", R''', R'''' is independently selected from hydrogen, alkyl groups having 1 to 4 carbon atoms, aryl groups, and vinyl groups and Q is a divalent hydrocarbon radical.

This invention also deals with new and novel compositions of matter which are the polysilacyclobutasilazanes prepared by the inventive process described herein. This invention also deals with crosslinked polysilacyclobutasilazanes and a process for crosslinking such polymers. This invention also relates to a process of converting the inventive compositions to ceramic materials and the ceramic compositions prepared thereby.

Turning now to the inventive process, it can be appreciated by those skilled in the art that the process deals with the reaction of 1,1-dichloro-1-silacyclobutane having the general formula

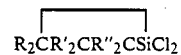

wherein R, R'and R"each have the meaning set forth above, with difunctional nucleophiles selected from ammonia, hydrazine and diamines having the general formula HR'''NQNR''''H.

The reaction must be carried out in an inert, essentially anhydrous atmosphere. By "inert", what is meant herein is that the reaction should be run in the absence of air or any gas which is reactive with either of the two types of reactants. It is known for example that oxygen in the air reacts with the reactants of this reaction or the ultimate polymer formed therefrom, to introduce oxygen into the molecules which eventually becomes incorporated in any ceramic material obtained from the polymer. The presence of oxygen in the ceramic precursors leads to thermal instability in the ceramic material and therefore oxygen should be avoided as much as possible everywhere in the process to convert the reactants of the process of this invention into ceramic materials. Similarly, "essentially anhydrous" for purposes of this invention means that precaution should be taken to prevent the introduction of water into the process of the instant invention as the water lends oxygen to the reactants resulting in the same disadvantage as described above. Further, water tends to cause hydrolysis of the hydrolyzable reactants herein and water should be avoided as much as possible, it being recognized that small amounts of moisture will probably be present even with precautions to prevent incorporation of the same.

Thus, it is necessary to use inert gases in this process to prevent the incidental reaction of undesirable reactants. Gases useful for this process are those normally used to provide an inert atmosphere, such as, argon, nitrogen, helium and the like. Preferred for this invention is argon.

"Contacting" for purposes of this invention, means any convenient method by which the materials of the reaction can be brought together. Generally, the reactants are mixed together by adding the difunctional nucleophile to the silacyclobutanes in a reaction vessel. The silacyclobutanes are liquids at room temperature and thus, it is convenient, for example, to bubble ammonia through the silacyclobutane in the reaction vessel, rather than add the silacyclobutane to a reaction vessel containing a blanket of ammonia.

The silacyclobutane and the difunctional nucleophile provide a polymeric material when the process is carried out at low temperatures. Thus, it is preferred that the process be carried out at less than room temperature and therefore, this invention is generally carried out at temperatures in the range of minus 50 degrees centigrade to as high as plus twenty five degrees centigrade. Most preferred is a temperature range of minus 40° C. to minus 20° C. This can be accomplished by the methods generally known in the art to maintain such low temperatures. Preferred for the inventive process herein is the immersion of the reaction flask, containing the reactants, into a dry ice/acetone bath.

"Reacting" for purposes of this invention means the reaction of the dichlorosilacyclobutane with the difunctional nucleophile to form the intended polymers, which polymers will be discussed infra. "Sufficient time" form polysilacyclobutasilazane means, for purposes of this invention, a time of at least thirty minutes of contact after the reactants have been placed together in the reaction vessel. Generally, enough time should be allowed after the total addition of the reactants, to form the highest yield possible. Thus, it is preferred for purposes of this invention to allow the reaction to proceed for at least four hours and it is generally preferred to allow the reaction to run at least seven hours, but not more than twenty four hours. After the reaction is complete, the polysilacyclobutasilazanbe that has been formed, is separated from the reaction mass by any known convenient means such as filtering and the like, it being understood that limited exposure of the product to air is necessary during this step. Solvents useful in this process are any of those organic solvents that are not reactive with the dichlorosilacyclobutane or the difunctional nucleophile, and which solubilize such reactants. Preferred for this process are chlorinated hydrocarbons, most preferred is methylene chloride.

Thus, in order to carry out the process of this invention, one generally places the dichlorosilacyclobutane in a reaction vessel, which has been prepared by excluding air and moisture. The reaction vessel is then blanketed with dry argon, said reaction vessel being equipped with at least a thermal indication means, stirring means, appropriate cooling and heating means, and addition devices, such as an addition funnel, for the addition of the other reactants. The reaction vessel and its contents are cooled to the appropriate temperature and the difunctional nucleophile is slowly added dropwise to the silacyclobutane with stirring, all the time maintaining a blanket of dry argon. After the addition of the difunctional nucleophile is completed, the reaction is allowed to stir either at reaction temperature, or at a higher temperature (up to room temperature) for a time sufficient to form the desired polymer, all the time maintaining an inert atmosphere. The polymer is then separated from the reaction mass by, for example, filtering, the solvent and unreacted materials are removed, these steps also being carried out under an inert atmosphere. The polymer can then be used right away or stored in the absence of air and moisture.

This invention also deals with new and novel compositions of matter. Such compositions are polysilacyclobutasilazanes wherein the polymer contains silacycle structures. The compositions are prepared by an inventive process whereby 1,1-dichloro-1-silacyclobutanes of the general formula

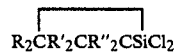

are reacted with difunctional nucleophiles containing nitrogen atoms selected from the group consisting of
 (i) ammonia
 (ii) hydrazine, and
 (iii) diamines having the general formula HR'''NQNR''''H wherein the definition of each R, R', R'', R''' and R'''' is set forth above.

Thus, regarding the silacyclobutanes, some of the compounds found useful in this invention are

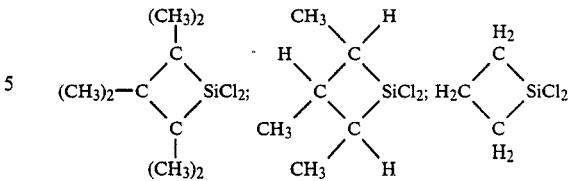

As indicated supra, these materials are well-known as are the processes by which they are made. By way of example, reference is again made to the following: U.S. Pat. Nos. 3,719,696; 3,687,995; 3,398,178; and 3,046,291.

One other type of reactant that is useful in this invention are the difunctional nucleophiles containing nitrogen atoms such as ammonia, hydrazine and diamines having the general formula HR'''NQNR''''H. For purposes of this invention, R''' and R'''' have the same definition as set forth above and Q is a divalent hydrocarbon radical selected from alkylene radicals having 1 to 8 carbon atoms, arylene, alkarylene having 12 carbons or less and aralkylenes having 12 carbons or less. In this invention, the diamines that are most useful include the straight chained aliphatic diamines such as $H_2N(CH_2)_xNH_2$ wherein x has a value of 1 to 8; branched chain aliphatic diamines, for example

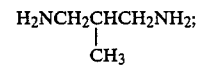

arylene diamines, such as, for example, $H_2NC_6H_4NH_2$; aralkylene diamines, such as, for example,

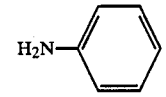

$CH_2CH_2NH_2$, and alkarylene diamines.

It is believed by the inventor herein that when ammonia is used in the process, polymers are formed having the structural formula

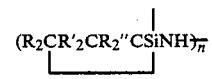

wherein n has a value of at least 2.

When hydrazine is used in the process, it is believed by the inventor herein that polymers having the structural formula

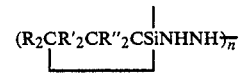

are formed, wherein n has a value of at least 2.

Further, when the diamines are used in the inventive process herein, using ethylene diamine as a specific example, it is believed by the inventor herein that polymers having the structural formula

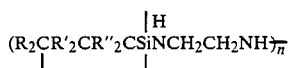

are formed, wherein n is at least 2.

These polymers are soluble in organic solvents, most notably chlorinated hydrocarbon solvents. They range from viscous oils to soft, semi-solid materials and are obtainable in high yields based on the starting materials, from the inventive process described herein. It is believed by the inventor herein that the polymers provided by this invention are mixtures of low molecular weight cyclic and linear oligomers.

As indicated above, this invention also deals with the cured polymers described herein and a method of curing such polymers.

The polymers prepared herein are believed to be self crosslinking through the thermally initiated ring opening of the silacycles incorporated in the silazane polymers. The inventor believes, but should not be held to the theory, that the crosslinking occurs similar to the following:

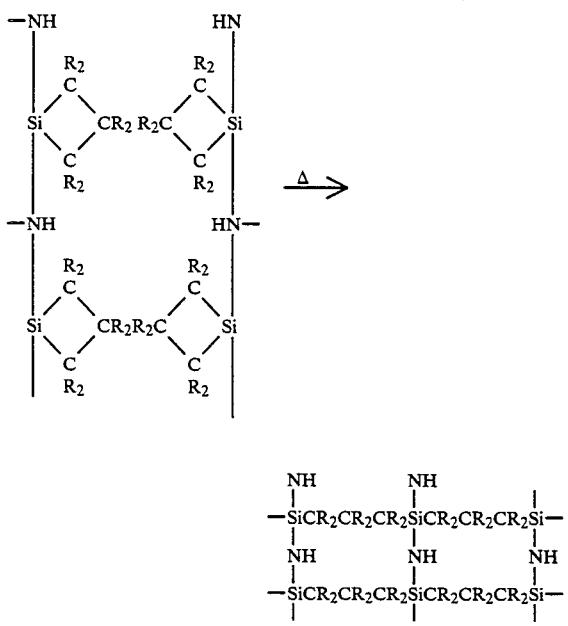

This crosslinking can also be initiated by catalysts. Catalysts considered useful in this regard are, for example, metal hydrides, such as sodium, potassium or lithium hydrides; metal alkoxides such as sodium, potassium or lithium methoxides; Metal amides, for example, Lithium diethylamide; rhodium catalysts such as Wilkinson's catalyst and platinum catalysts such as chloroplatinic acid.

This type of cure mechanism would not be obvious from the prior art because it is believed by the inventor that the cure reaction involves a radical chain mechanism similar to the following wherein the symbol

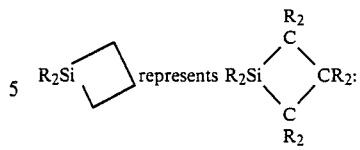

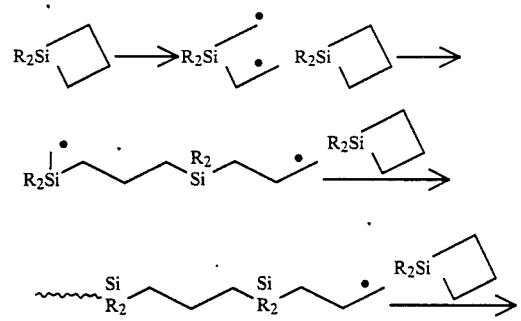

It is believed that an abstraction of an NH radical by the carbon radical terminates the reaction and prevents cure since an NH radical is thermodynamically more stable than the carbon radical. Analogous —SiH radicals have been shown to be effective chain terminators in the transition metal catalyzed polymerization of silacyclobutanes.

Almost all of the known pre-ceramic polymers depend upon either air, moisture, or a combination of both to achieve a cured polymer capable of maintaining its shape during pyrolysis. Numerous low oxygen preceramic polymers are known, but there are very few low oxygen polymers that are cured. Oxygen cured ceramics have oxygen contents of 10 to 15 percent. This high oxygen content in the ceramic is generally detrimental, leading to the loss of CO from a reaction of the oxygen with carbon at pyrolysis temperatures. This problem results in decreased ceramic properties.

As of this writing, only two reports have been made public regarding non-oxidative cures of polymers: R. West, L. D. David, P. E. Djurovich, K. L. Stearley, K. S .V. Srinvasan, and H. Yu, J. Am. Chem. So. 103, 7352 (1981) and D. Seyferth and G. H. Wiseman, Comm. Am. Cer. Soc. C-132 (1984). West et al. have prepared a copolymer of dimethylsilylene and phenylmethylsilylene units, i.e. polysilastyrene, which crosslinks upon UV irradiation and Seyferth and Wiseman, have prepared a version of methylhydridosilazane which is soluble in organic solvents, but does not melt upon heating.

Therefore, with the exception of the hydrazine derivative, this invention also contemplates the use of the non-oxidatively crosslinked polymers of this invention in the preparation of ceramic materials by the pyrolysis of such crosslinked polymers at elevated temperatures, that is, in excess of 700° C. Ceramic char yields using these crosslinked polymers ranged from 60 to 80 percent with low oxygen contents ranging from 1.5 to 4.0 percent when fired at 1200° C. in argon.

All of the ceramics prepared thereby have excellent oxidative stability.

These polymers are susceptable of being shaped and then crosslinked to hold their shape while being fired into ceramics. It has been found that certain of these polymers have the handleability that enables one to extrude them.

Now so that those skilled in the art can better understand and appreciate the invention, the following examples are given. These examples are for purposes of illustration only and are not to be regarded as limitations on the scope of the invention as presented herein.

All of the polymers were characterized by a combination of 'HNMR, infrared analysis, elemental analysis, gel phase chomatography (GPC), thermogravimetric and thermomechanical analysis (TGA and TMA respectively).

'HNMR spectra were obtained on a Varian EM-390, 90 MHz instrument, infrared spectra were obtained on a Nicolet DX5 Spectrophotometer under a nitrogen atmosphere. TMA was done on a DuPont 940 thermomechanical analyzer. TGA was done on an Omnitherm TGA interfaced to an Omnitherm 2066 computer. GPC was carried out on a DuPont Instruments GPC equipped with a Spectra Physics SP4100 integrator and a DuPont refractive index detector. The GPC molecular weights are based upon a calibration curve derived from fractionated silazane polymers prepared by the method of Gaul in U.S. Pat. No. 4,340,619 using polystyrene standards.

Elemental analysis of carbon, hydrogen and nitrogen was done by a method of catalytic oxidation of the sample. Carbon and hydrogen are measured as carbon dioxide and water. Nitrogen is measured in the elemental form. Such analyses were carried out essentially by the methods set forth in Niederl and Niederl, "Micromethods of Quantitative Organic Analysis", 2nd ed., 1942, John Wiley and Sons.

Silicon was determined by a method of atomic absorption spectrometry/fusion techniques. Silicon containing materials and mixtures are converted to a soluble form of silicon and the soluble silicon is quantitatively determined in the percent range as total silicon by atomic absorption spectrometry. Samples are weighed and fused by any generally accepted techniques. The fusionate is solubilized, diluted to a known volume with distilled water and analyzed in a spectrophotometer.

Total chloride was determined by a method of sodium peroxide decomposition and the decomposition product was titrated using silver nitrate.

Curing temperatures were determined by using differential scanning calorimetry analysis of the polymer.

EXAMPLE 1

This material does not fall within the scope of the materials claimed herein. It is shown for convenience and to illustrate how the precursor 1,1-dichloro-1-silacyclobutanes are obtained.

All reactions were performed in a dry argon atmosphere with oven-dried glassware unless otherwise noted. All solvents were reagent grade and used as purchased.

Preparation of 1,1-dichloro-1-silacyclobutane.

To magnesium powder (3.4g-atom) in one liter of anhydrous ether, in a round-bottomed, three-necked glass flask equipped with a stirrer, thermocouple and addition funnel, was added a solution of 400 gms (1.88 mole) of 3-chloropropyltrichlorosilane in 600 ml of anhydrous ether. The addition was made over an 8 hour interval. Additional ether, about 1½ liters and THF, about one liter were added as necessary in order to maintain stirring and keep the magnesium suspended. The flask contents were brought to reflux by heating and the reflux was maintained for three days whereupon the reaction vessel was cooled to room temperature, the reaction mass diluted with hexane, and the whole was filtered. The inorganic salts were washed with hexane and the filtrates were combined. The combined filtrates were distilled to afford a 56% yield (148 gms) of 1,1-dichloro-1-silacyclobutane having a boiling point of 111° to 115° C.

EXAMPLE 2

Preparation of Polysilacyclobutasilazane Using Ammonia

A solution of 400 gms (2.84 moles) of

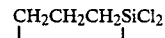

in 2.5 liters of methylene chloride was treated by bubbling ammonia gas through the solution while the temperature of the solution was maintained between −20° and −40° C. for seven hours. At the end of seven hours, the reaction mass was warmed to room temperature, filtered through a medium glass frit and concentrated by rotary evaporation, the filtration being rapid, was not done in an inert gas. The yield of polymer was 219 gms (91% yield). 'HNMR (CDCl$_3$) showed δ1.36 (m, 4H), 1.77 (m, 2H); IR taken on a film showed 3374 (N-H,s), 2959 (s), 2932 (s) 2868 (m), 2783 (w), 1454 (w), 1406 (m), 1391 (m), 1209 (s), 1180 (s), 955 (s), 689 (s) cm-1. GPC molecular weight gave weight average (Mw)=292, Z average=508, No. average, (Mn)=189, Z+1 average=809, Mw/Mn=1.54.

EXAMPLE 3

Preparation of Polysilacyclobutasilazane Using Ethylenediamine

A 250 ml, 3-necked, round-bottomed glass flask equipped with a pressure-equalized addition funnel with a gas inlet, stirrer and a septum was charged with 25 gms (0.177 mole) of 1,1-dichloro-1-silacyclobutane, 37.0 gms (0.366mole) of triethylamine and 200 ml of methylene chloride. The solution was cooled to 0° C. and 10.788 gms (0.180Mole) of ethylenediamine was added dropwise over a thirty minute interval. After stirring for thirty minutes at 0° C., the reaction mass was warmed to room temperature and allowed to stir for 24 hours. The resulting mixture was filtered under argon through Celite and concentrated using vacuum whereupon 12.04 gms of product was obtained as a soft solid for a yield of 62.7%. 'HNMR (CDCl$_3$) showed δ0.47-2.13 (broad m), 3.13 (s). The ratio of SiNH: NCH$_2$N was 3.0:1. IR on a film gave 3310 (w), 2953 (m), 2924 (m), 2868 (m), 1582 (m), 1462 (m), 1406 (m), 1391 (m), 1335 (m), 1215 (m), 1124 (s), 1069 (s), 1011 (s), 934 (m), 822 (m), 649 (m). GPC molecular weight was Mw=478; Z avg. =564; Mn=370; z+1=630 and Mw/Mn=1.29.

EXAMPLE 4

A flask, fitted as in example 3 was charged with 25.0 gms (0.177 Mole) of 1,1-dichloro-1-silacyclobutane, 37.0 gms (0.366 Mole) of triethylamine and 150 ml of methylene chloride. The solution was cooled to −20° C. and 5.80 gms (0.18 Mole) of hydrazine was added dropwise over a 20 minute interval. After the addition was complete, the reaction was stirred at −20° C. for 30 minutes and then allowed to warm to room temperature. After stirring for 24 hours, the reaction mass was filtered under argon and the filtrate was concentrated under reduced pressure to give 13.20 gms of product as a white, brittle solid at a yield of 73.9%. 'HNMR (CDCl₃) showed δ1.50 (center of broad s), 3.00 (broad s). The ratio was 19.0:1. IR film showed 3339 (m), 2952 (m), 2932 (m), 2868 (m), 1587 (w), 1454 (w), 1406 (s), 1215 (w), 1124 (s), 1026 (s), 920 (m), 716 (m). GPC molecular weight gave Mw=4965, Z avg.=8847, Mn=1430, Z+1 avg. =13176 and Mw/Mn=3.47

EXAMPLE 5

A 250 ml, 3-necked, round-bottomed, glass Dewar condenser with a gas outlet and a gas inlet tube was charged with 9.742 gms (0.0691 Mole) of 1,1-dichloro-silacyclobutane, 5.04 gms (0.0372 Mole) of HSiCl₃ and 150 ml. of methylene chloriode. The solution was cooled to −20° C. and dry gaseous ammonia was rapidly bubbled through the solution for about two hours. After warming to ambient temperature, the solution was filtered through dry Celite and concentrated at reduced pressure to give 5.48 gms of a viscous oil for a 70.3% yield. 'HNMR (CDCl₃): δ1.33 (m), 1.57 (m), 4.77 (broad s). The (H₂CH₂CH₂CSiNHNH)ₙ: SiH ratio was 35.8:1.

IR film: 3369 (s), 2959 (s), 2927 (s), 2869 (m), 2147 (m), 1450 (w), 1409 (m), 1393 (m), 1196 (s), 1179 (s), 1123 (s), 950 (s), 687 (s).

I claim:

1. A polysilacyclobutasilazane composition prepared by a process comprising:
   (I) contacting and reacting in an inert, essentially anhydrous atmosphere, 1,1-dichloro-1-silacyclobutane having the general formula R₂CR'₂CR''₂CSiCl₂ with a difunctional nucleophile selected from the group consisting of
   (i) ammonia
   (ii) hydrazine
   (iii) diamines having the general formula HR'''NQNR''''H at a temperature of minus 50° to +25° C. for a time sufficient to form polysilacyclobutasilazane;
   (II) recovering the polysilacyclobutasilazane from the reaction mass in (I) wherein each R, R', R'', R''', and R'''' is independently selected from hydrogen, alkyl groups having 1 to 4 carbon atoms, aryl groups and vinyl groups, and Q is a divalent hydrocarbon.

2. A composition as claimed in claim 1 wherein the difunctional nucleophile, ammonia, is used in the process.

3. A composition as claimed in claim 1 wherein the difunctional nucleophile, hydrazine, is used in the process.

4. A composition as claimed in claim 1 wherein a difunctional nucleophile, having the general formula HR'''NQNR''''H, is used in the process.

5. A composition as claimed in claim 4 wherein the difunctional nucleophile, H₂N(CH₂)₂NH₂, is used in the process.

6. A composition as claimed in claim 4 wherein the difunctional nucleophile, HCH₃N(CH₂)₂NCH₃H, is used in the process.

7. A composition as claimed in claim 4 wherein the difunctional nucleophile, HC₂H₅N(CH₂)₂NC₂H₅H, is used in the process.

8. A composition as claimed in claim 4 wherein the difunctional nucleophile,

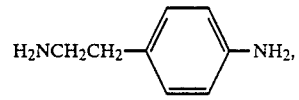

is used in the process.

9. A method of crosslinking the composition of claim 1, the method comprising heating the composition in the presence of essentially anhydrous air to a temperature in the range of 200° C. to 280° C.

10. A method as claimed in claim 9 wherein the composition is heated to a temperature of 220° to 260° C.

11. A method of crosslinking the composition of claim 1, the method comprising heating the composition in the absence of air to a temperature of 140° to 230° C.

12. A method as claimed in claim 11 wherein the composition is heated to a temperature of 185° to 210° C.

13. A composition prepared by the method of claim 9.

14. A composition prepared by the method of claim 11.

15. A composition as claimed in claim 1 wherein the reaction is carried out for at least two hours.

16. A polysilacyclobutasilazane having the structural formula

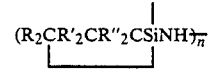

where n has a value of at least 2 and each R, R', and R'' is independently selected from the group consisting of hydrogen, alkyl groups having 1 to 4 carbon atoms, aryl groups and vinyl groups.

17. The polysilacyclobutasilazane of claim 16 where R, R', and R'' are hydrogen.

18. A polysilacyclobutasilazane having the structural formula

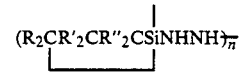

where n has a value of at least 2 and each R, R', and R'' is independently selected from the group consisting of hydrogen, alkyl groups having 1 to 4 carbon atoms, aryl groups and vinyl groups.

19. The polysilacyclobutasilazane of claim 18 where R, R', and R'' are hydrogen.

20. A polysilacyclobutasilazane having the structural formula

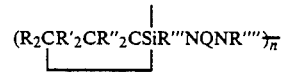

where n has a value of at least 2; each R, R', R''', and R'''' is independently selected from the group consisting of hydrogen, alkyl groups having 1 to 4 carbon atoms, aryl groups and vinyl groups; and Q is a divalent hydrocarbon radical selected from the group consisting of alkylene radicals having 1 to 8 carbon atoms, arylene, alkarylene having 12 carbons or less and aralkylenes having 12 carbons or less.

21. The polysilacyclobutasilazane of claim 20 where Q is an ethylene radical and R, R', and R'' are hydrogen.

* * * * *